July 27, 1965   F. A. CHIDSEY, JR   3,196,588
METHOD OF SEALING PACKAGES
Original Filed July 10, 1961   2 Sheets-Sheet 1
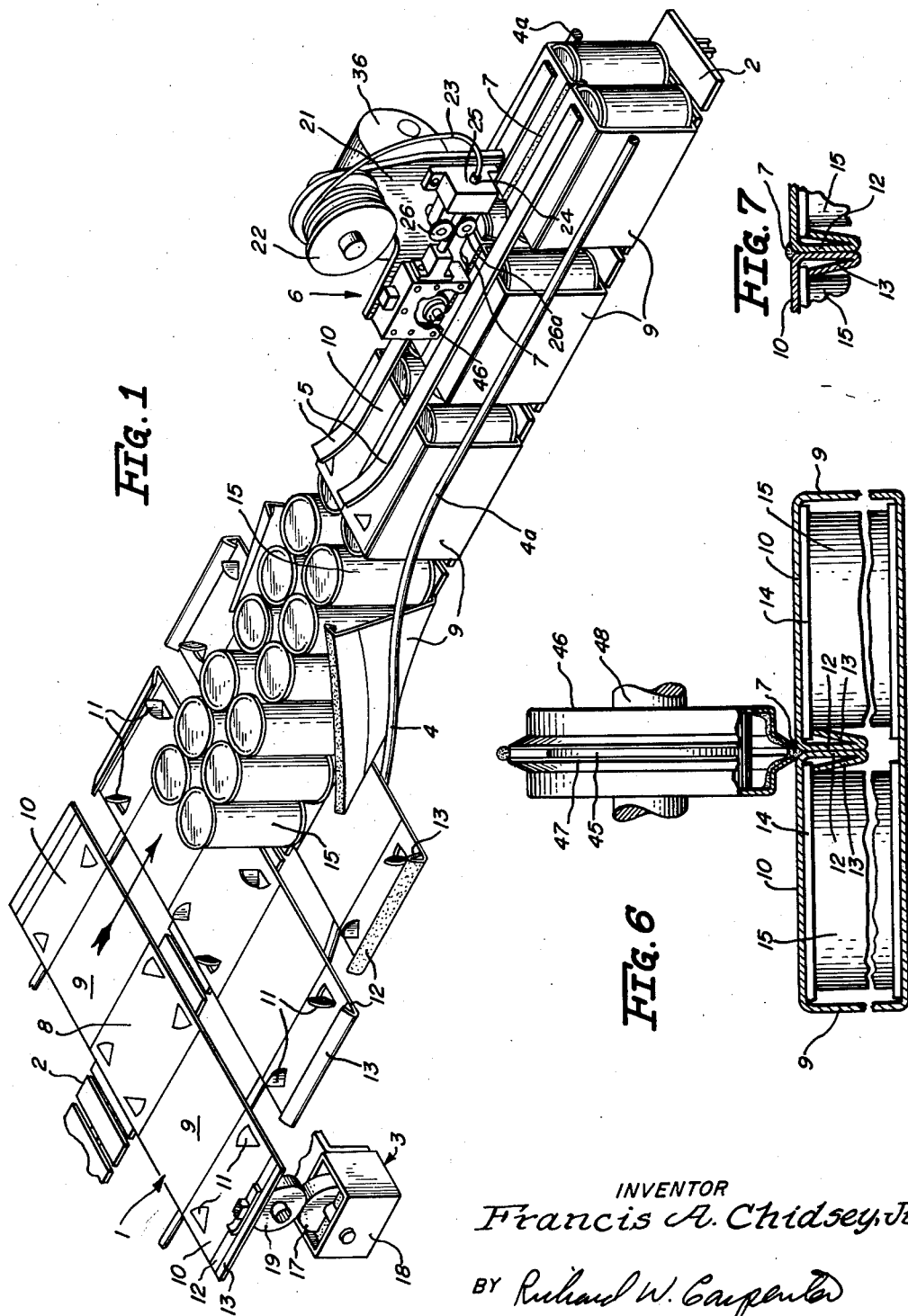
INVENTOR
Francis A. Chidsey, Jr.
BY Richard W. Carpenter
ATTORNEY July 27, 1965   F. A. CHIDSEY, JR   3,196,588
METHOD OF SEALING PACKAGES
Original Filed July 10, 1961   2 Sheets-Sheet 2
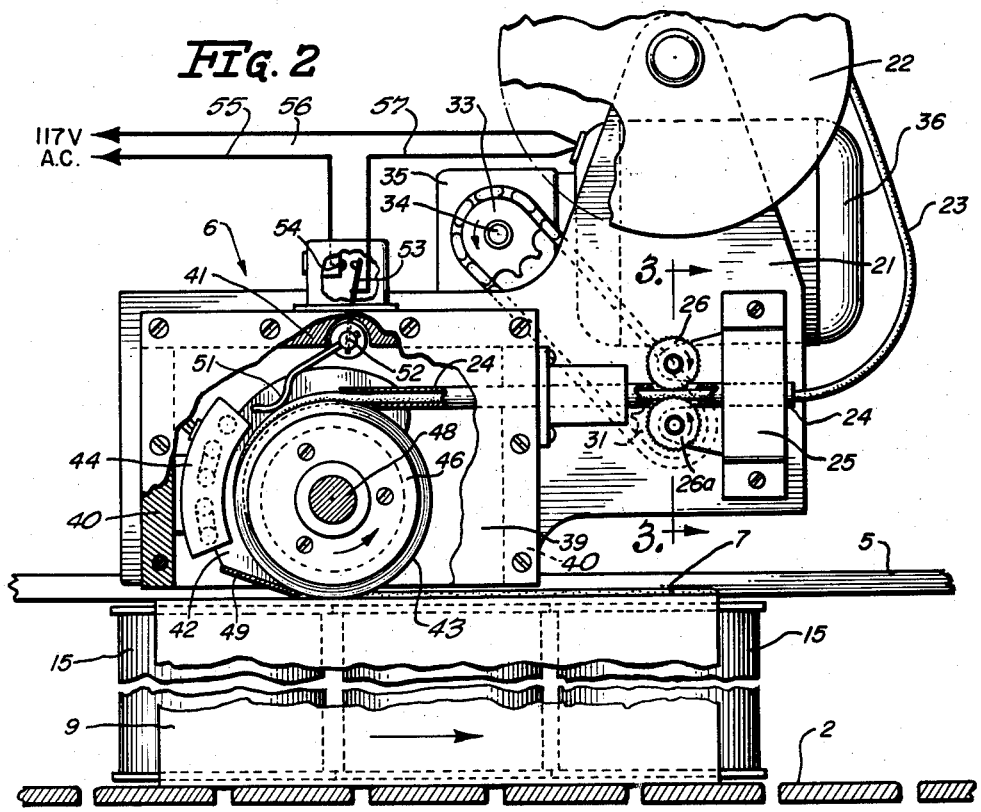
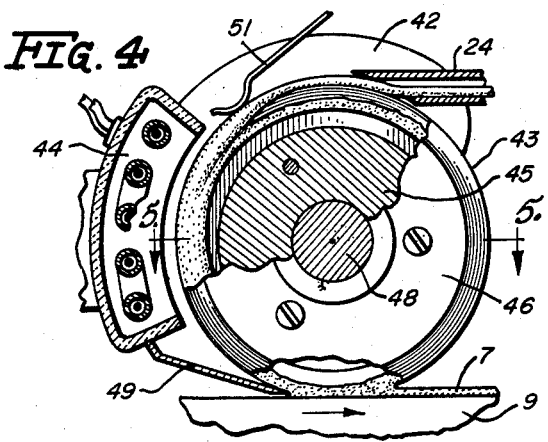
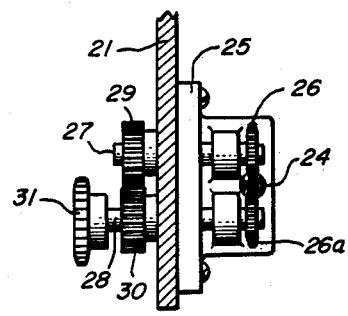
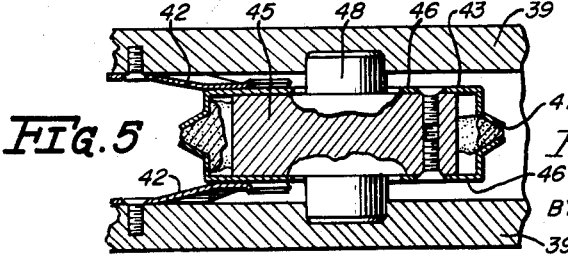
INVENTOR
Francis A. Chidsey, Jr.
BY Richard W. Carpenter
ATTORNEY 3,196,588
METHOD OF SEALING PACKAGES
Francis A. Chidsey, Jr., Devon, Pa., assignor to Container Corporation of America, Chicago, Ill., a corporation of Delaware
Continuation of application Ser. No. 125,920, July 10, 1961. This application Aug. 2, 1963, Ser. No. 299,671
1 Claim. (Cl. 53—32)

The present invention relates to the art of loading and closing of packages and more particularly relates to methods of and mechanism for sealing a closure joint on newly formed packages of the type including a group of articles wrapped in a strip of folding paperboard. This application is a continuation of my co-pending application Serial No. 125,920 filed July 10, 1961 entitled Method of and Mechanism for Sealing Packages.

Principal objects of the invention are to provide an effective method for securely sealing paperboard, wraparound cartons which enclose groups of articles, such as filled cans of beverage or other commodity, and to provide simple and easily operated mechanism for carrying out the method.

A further object of the invention is to provide, in a carton loading and sealing machine, mechanism operating in conjunction with the glue applying and closing devices which will effect an immediate seal of a glued joint and hold such joint intact during the period necessary to enable the glue to set; and, by such operation, making it unnecessary to provide at the discharge end of the loading and sealing mechanism a relatively long holding conveyor or other mechanical holding means to retain the glue joint of the carton intact while the glue is setting.

A still further object of the invention is to provide means for applying a line of thermoplastic or "hot melt" sealing material along a centrally located glue joint of a wrapper type carton immediately after the closure portions of the carton have been brought to final position, such sealing material serving to hold the joint intact while the glue is setting, and by such operation making it feasible to employ types or compositions of adhesive in the primary package joint which have a reasonably slow setting time, thereby serving to simplify the problem of handling the adhesive at the point or points of application.

Other and more specific objects and advantages of the present invention will become apparent as the description proceeds.

In the drawings—

FIG. 1 is a schematic perspective view showing packages being formed on a conveyor and showing the mechanism for applying hot melt sealing material along the glue joint of the carton which has just been folded about a group of articles;

FIG. 2 is a fragmentary detail view in side elevation to illustrate the hot melt applicator mechanism;

FIG. 3 is a fragmentary detail view in vertical section taken along line 3—3 of FIG. 2 showing the means for drawing the sealing composition in solid, but flexible, form into the hot melt heating chamber;

FIG. 4 is an enlarged fragmentary detail view of the disk member with hollow edge portion to hold the hot melt and spread it in a narrow bead upon the package joint;

FIG. 5 is a horizontal cross sectional view taken on line 5—5 of FIG. 4 showing the internal structure of the hot melt applicator member;

FIG. 6 is a fragmentary detail view in vertical cross section through the completed package showing the closure glue joint and the location of the hot melt sealing material; and FIG. 7 is a fragmentary detail view taken in cross-section showing the carton joint as it appears after passing the hot melt applicator.

In carrying out the present invention a plurality of wrappers, in flat, rectangular form, are preferably advanced continuously upon a conveyor. Groups of cans are delivered centrally of the wrapper and ordinary glue or other adhesive is applied along a free end portion of the wrapper strip. The side and end portions of the wrapper are then folded about the sides of the can group and the wrapper ends are brought together over the fourth side of the can group with the glued edge in facial contact with the other edge of the wrapper strip. Immediately after the ends are brought together a line of hot melt sealing material is applied along the glue joint. The hot melt material is applied in a fluent, tacky condition and cools quickly to form a firm bond and thus maintains the glue joint intact until the glue has set. The term hot melt sealing material as used herein is intended to include any suitable thermoplastic material which becomes soft and tacky upon being heated and exhibits bonding characteristics upon cooling.

Referring particularly to the drawings, the carton wrappers in blank form, shown at 1, 1, are advanced in spaced relation on a suitable conveyor 2.

One end of the wrapper has glue or other adhesive applied to it by the glue applicator 3. The free end portions of the carton strips or blanks, in the present instance, are folded so as to be insertable in between the chimes of two rows of cans. A group of cans or other articles is delivered to the central panel of each wrapper blank. The free portions of the wrapper at the ends of the central panel are then folded upward by plow members, one of which is indicated at 4. The panels forming the closure are then folded down by suitable plows, not shown, and the wrapper ends are inserted between the two rows of cans. Hold-down bars 5, 5 hold the closure panels firmly against the can ends as the wrapper advances past a hot melt applicator, indicated as a whole at 6. The hot melt is applied in a fluent or semi-fluid and tacky condition, preferably as a narrow strip or bead 7 along the newly formed glue joint. The hot melt cools rapidly upon contact with the paperboard along the glue joint and the completed package is then in condition for further regular mechanical handling, such as mechanically placing the packages within a tray or other container. Thus, by the time the packages would normally be subjected to the stresses of manual handling, usually several hours, the glue applied to the end portions inserted between the can rows will be firmly set so that the joint will be sufficiently strong to remain intact even when subjected to rough and unusual handling.

The principal details of the conveyor and cooperating mechanism for advancing and folding the wrapper strips about the can groups and for tucking similar wrapper ends between the rows are illustrated and described in pending application Ser. No. 791,298, filed February 5, 1959, now Patent No. 3,013,796, assigned to the assignee of the present application. Reference is made to this pending application for the description of the details of various features disclosed only generally herein.

The wrappers as disclosed herein have a central or main panel 8, side panels 9, 9 and closure panels 10, 10. The closure panels have a width one-half that of the main panel 8 and together form what may be termed a composite panel. In practice this composite panel is employed as the bottom panel of the carton, but for convenience they are uppermost while forming the packages. The can rows preferably project partly from the ends of the package and the end cans in each row are held in place by infolded retaining tabs 11, 11.

The end portions of the wrapper strips each have narrow panels 12 and 13 which are folded as the strips are advanced so that they may be inserted between the can rows. See FIG. 6. The narrow panels 13 are of less width than the panels 12 so that the free edges of each panel 13 may bear against the chime 14 of each can 15.

The conveyor 2 is provided with pusher elements, not shown, that bear against the trailing edges of the wrapper blanks and carry the blanks past the glue applicator 3 in which a roll 17, revolving in a glue pot 18, will transfer glue to a roll 19, which in turn applies a coating of glue to the underside of the panel 12 as viewed in FIG. 1. If desired, the application of glue to panel 12 can be advanced to a point that is just beyond the place where both panels have been folded. The particular place where glue is applied to panel 12 is not material so far as the present disclosure is concerned.

As the blank advances it will pass devices which will fold the retaining tabs out of the plane of the blank to prepare such tabs for engagement with the can chimes.

Upon further advance of the wrapper blank a group of cans, herein shown as two rows of three cans each, will be delivered onto the main panel. This may be effected by structure such as shown in the pending application referred to above. The particular manner of delivering the cans onto the main panel of the blank is not material. The end cans of the rows will be brought into their final position with the retaining flaps folded through 180° to bear against the can ends and with the free edge of the tab bearing edgewise on the inside wall of the chime. The particular manner of folding and controlling the tabs 11 forms no part of the present invention.

After the can group has been delivered onto the main panel the end portions of the blank are advanced past folding plows, as shown at 4 in FIG. 1, to bring the side panels 9 up against the vertical sides of the cans. The narrow panels 10, 10 are then forced down and inward by suitable folders, as shown in the above mentioned application, to fold them toward the ends of the cans. The panels 10, 10 pass beneath the hold-down bars 5, 5 which bring them into close contact with the can ends and at the same time cause the sets of folded panels 12 and 13 to be inserted between the can rows so that the upper edges of the panels 13, 13 will snap in place under the chimes 14 of the cans. If desired, the can rows may be spread apart a small distance by means such as disclosed in the application referred to above, but the particular manner of effecting the insertion of the two pairs of flaps 12 and 13 between the can chimes is not material.

As shown in FIG. 1, the plows 4 have guide sections 4a that extend along the path of movement of the can groups and serve to hold the side wall panels in close relation to the vertical sides of the cans. The guide sections 4a and the hold-down bars 5 thus tend to hold the wrapper joint in position so that the meeting surfaces of the narrow panels 12, 12 will be held in firm contact as the packages are advanced.

The hot melt applicator 6 is suitably supported on a frame plate 21 which may be attached to the main frame of the conveyor. In the present instance the supply of sealing material is held on a reel 22 and the material is in the form of a flexible, rope-like cylinder 23 wound on the reel. The free end of the cylinder 23 is fed through a small bore tube 24 held in bracket 25 secured to the frame plate 21. The tube 24 is formed with upper and lower openings into which the peripheries of knurled feed wheels 26, 26a extend. See FIG. 3. The knurled wheels are fixed on short shafts 27 and 28, journalled in the bracket 25, and having meshing pinions 29 and 30 fixed thereon. A sprocket 31 fixed on shaft 28 is driven by a chain 32 passing over sprocket 33 fixed on a shaft 34 journalled in a gear box 35, suitably attached to plate 21. The shaft of a small motor 36 drives shaft 34 through gearing in the gear box 35.

The tube 24 extends into a casing comprising two side wall plates 39, 39, vertical plates 40, 40 and top plate 41. The cylinder of sealing material is fed through the tube 24 by rotation of the knurled wheels and emerges into a space between side retaining plates 42, 42 arranged at the sides of a rotary applicator member indicated at 43. The portion of the casing enclosed by the plates 42 and the applicator member may be considered a collecting chamber for retention of the sealing material in fluent condition. For the purpose of melting the sealing material a suitable heater element 44 is arranged between the plates 42 and in spaced relation to the rotary member 43.

The rotary member 43 has an annular chamber for reception of the fluent sealing material. While the member 43 may be constructed in various ways, it is herein shown as including a central core 45 to which plates 46, 46 are secured. These plates are shaped, as best shown in FIG. 5, to provide a restricted edge opening 47 through which the fluent sealing material may be spread onto a moving surface as the member 43 is rotated. The core 45 is mounted on a spindle 48 having its ends rotatably received in bearing recesses in the plates 39.

For the purpose of feeding a small strip or bead of fluent sealing material from the open edge of the rotary member, the retaining plates 42 may be joined at their lower ends and formed into a doctor blade element 49, somewhat V-shape in transverse cross-section where the blade element comes into close proximity to the edge of the rotary member. As the cylinder of sealing material emerges from the tube 24 it rests upon the open edge of the rotary member 43 and as it approaches the heating element it tends to soften and lose its cylindrical shape. The feeding of the fluent material from the lower part of the rotary member tends to reduce the thickness of the softened material a short distance from the end of the tube 24. A control finger or lever 51 is employed to maintain a substantially constant quantity of sealing material within the space between the edge of the rotary member and guide plates 42. The upper end of finger 51 is held in a spindle 52 having its ends journalled in the plates 39. Also fixed on the spindle is the lower end of a yieldable switch lever 53 having a contact element engageable with a stationary contact element 54. The switch is normally open but when the finger swings slightly counterclockwise, as seen in FIG. 2, the switch lever will be caused to close against contact 54, thus closing the circuit through conductors 55, 56 and 57 to motor 36. Actuation of the motor rotates knurled wheels 26 and 26a to feed the solid cylinder of sealing material toward the left as viewed in FIG. 2. This causes the solid sealing material to move beneath the finger 51 and when it has swung sufficiently clockwise the switch element 53 will be moved to break the contact with the stationary contact element 54, opening the motor circuit and stopping the motor.

The rotary member is arranged above the package conveyor at a height so that packages moving beneath it will bear frictionally against the lower periphery of the rotary member and cause it to rotate. By centering the rotary member exactly over the path of the package glue joint, as shown in FIG. 6, the member will be caused to rotate and a narrow strip or bead of sealing material will be deposited along the joint. Other specific means may be employed to deposit hot melt material along the joint, such as an extrusion nozzle, and the material could be applied along the joint in a series of dots or short, spaced lines.

From the foregoing it is apparent that the present invention provides a method and apparatus for sealing packages that effectively holds the closure flaps in position as soon as the hot melt sealing material is applied along the package joint. By use of the hot melt sealing material it is feasible to eliminate completely from the discharge end of the mechanism the usual pressure applying structure to hold the parts of the joint in position while the slow setting adhesive has time to set. This is of particular importance in connection with packages formed with a wrapper such as disclosed herein which requires that the side walls as well as the closure panels be held firmly against the article group. Even with an extended pressure section to hold the closure parts until the adhesive in the joint has set, it is necessary to employ rather rapid setting adhesives which have the disadvantages of being more expensive and less convenient to handle with conventional adhesive applying devices.

The hot melt sealing material hardens immediately upon cooling and produces a secondary bond for the package joint that permits all ordinary machine handling of the packages, such as the transfer of the packages to other conveying means, and mechanical loading of the packages into trays or shipping containers. The adhesive in the primary joint thus, in ordinary practice, is allowed ample time to set thoroughly before the packages experience manual handling as for example in a retail store where packages are occasionally accidentally dropped or otherwise subjected to unusual stresses.

While the description sets forth a preferred embodiment of the invention, and discloses a particular construction of package, it is apparent that various changes can be made without departing from the spirit of the invention, and it is therefore desired that the present embodiment be considered in all respects as illustrative and not restrictive, reference being had to the appended claim rather than to the foregoing description to indicate the scope of the invention.

I claim:

The method of forming a package of the type in which cans grouped in two longitudinal rows are confined in a paperboard sleeve formed from a blank having a central panel disposed against corresponding ends of the cans, side panels hinged to the central panel and folded against the sides of the cans, closure panels hinged to respective side panels and folded against the opposite ends of the cans, and glue panels hinged to respective closure panels and folded in face-to-face contact with each other between the rows of cans, comprising the steps of:

(a) continuously advancing the blank, in a direction transverse to its length, with one side of the central panel disposed against corresponding ends of the cans;

(b) applying a primary adhesive to one of the glue panels on the side of the blank opposite from that disposed against the ends of the cans;

(c) wrapping the blank around the group of cans and inserting the glue panels between the rows in face-to-face contact with each other to form a primary glue joint extending longitudinally of the package between adjacent edges of said closure panels;

(d) applying compression to the panels to maintain the package in snug erected condition;

(e) applying a secondary adhesive, having a faster rate of setting than said primary adhesive and in the form of a narrow bead, between the adjacent edges of said closure panels to form a secondary glue joint substantially co-extensive with and disposed outwardly adjacent said primary glue joint;

(f) maintaining said compression against said panels until the secondary adhesive has set sufficiently to make the package self-supporting while the primary adhesive is setting;

(g) releasing said compression.

References Cited by the Examiner

UNITED STATES PATENTS

| | | | |
|---|---|---|---|
| 1,974,256 | 9/34 | Bergstein | 53—47 |
| 2,316,531 | 4/43 | Nivling | 118—244 |
| 2,928,370 | 3/60 | Gross | 118—202 |
| 3,107,182 | 10/63 | Anderson et al. | 118—260 |

FRANK E. BAILEY, *Primary Examiner.*

TRAVIS S. McGEHEE, *Examiner.*